United States Patent
Frederiksen

(12) 
(10) Patent No.: US 6,195,569 B1
(45) Date of Patent: *Feb. 27, 2001

(54) PHONE DISPLAYING ALTERNATIVE FUNCTIONALITY MENU

(75) Inventor: Steen Lillethorup Frederiksen, Allerod (DK)

(73) Assignee: Nokia Mobile Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/026,362

(22) Filed: Feb. 19, 1998

(30) Foreign Application Priority Data

Feb. 21, 1997 (GB) .................................. 9703646

(51) Int. Cl.[7] ...................................... H04B 1/38
(52) U.S. Cl. ........................ 455/566; 455/550; 455/575; 345/352; 345/345
(58) Field of Search .................... 455/550, 566, 455/575, 90, 158.4; 379/387; 345/352, 353, 345, 347

(56) References Cited

U.S. PATENT DOCUMENTS

| 5,016,002 | 5/1991 | Levanto | 340/756 |
| 5,581,685 | * 12/1996 | Sakurai | 345/353 |
| 5,583,560 | * 12/1996 | Florin et al. | 455/4.2 |
| 5,625,783 | * 4/1997 | Ezekiel et al. | 709/320 |
| 5,736,703 | * 4/1998 | Kim | 200/1 B |
| 5,737,394 | * 4/1998 | Anderson et al. | 379/88.1 |
| 5,758,295 | * 5/1998 | Ahlberg et al. | 455/566 |
| 5,774,540 | * 6/1998 | Davidson et al. | 379/387 |
| 5,841,855 | * 11/1998 | Davidson et al. | 379/387 |
| 5,852,783 | * 12/1998 | Tabe et al. | 455/550 |

FOREIGN PATENT DOCUMENTS

| 0633684 A2 | 1/1995 | (EP) . |
| 2 319 691 | 5/1998 | (GB) . |
| WO 95/25397 | 9/1995 | (WO) . |

* cited by examiner

Primary Examiner—Dwayne D. Bost
Assistant Examiner—Sonny Trinh
(74) Attorney, Agent, or Firm—Perman & Green, LLP

(57) ABSTRACT

A radiophone is provided with a user interface including a display and a keypad. The keypad comprises a set of keys for entering data, at least one multi-functionality key and a menu scrolling device for scrolling between functionalities of said at least one multi-functionality key. The display comprises a basic screen area for displaying information, said displayed information comprising information entered by said data entering keys and information received from the network, a separate field for displaying the present functionality of said at least one multi-functionality key; and an auxiliary field for displaying alternative functionalities of said at least one multi-functionality key. A controller controls the functionality of said multi-functionality key and the information displayed in the display, and displays said auxiliary field on top of a part of the basic screen area in response to the activation of the scrolling device.

11 Claims, 4 Drawing Sheets

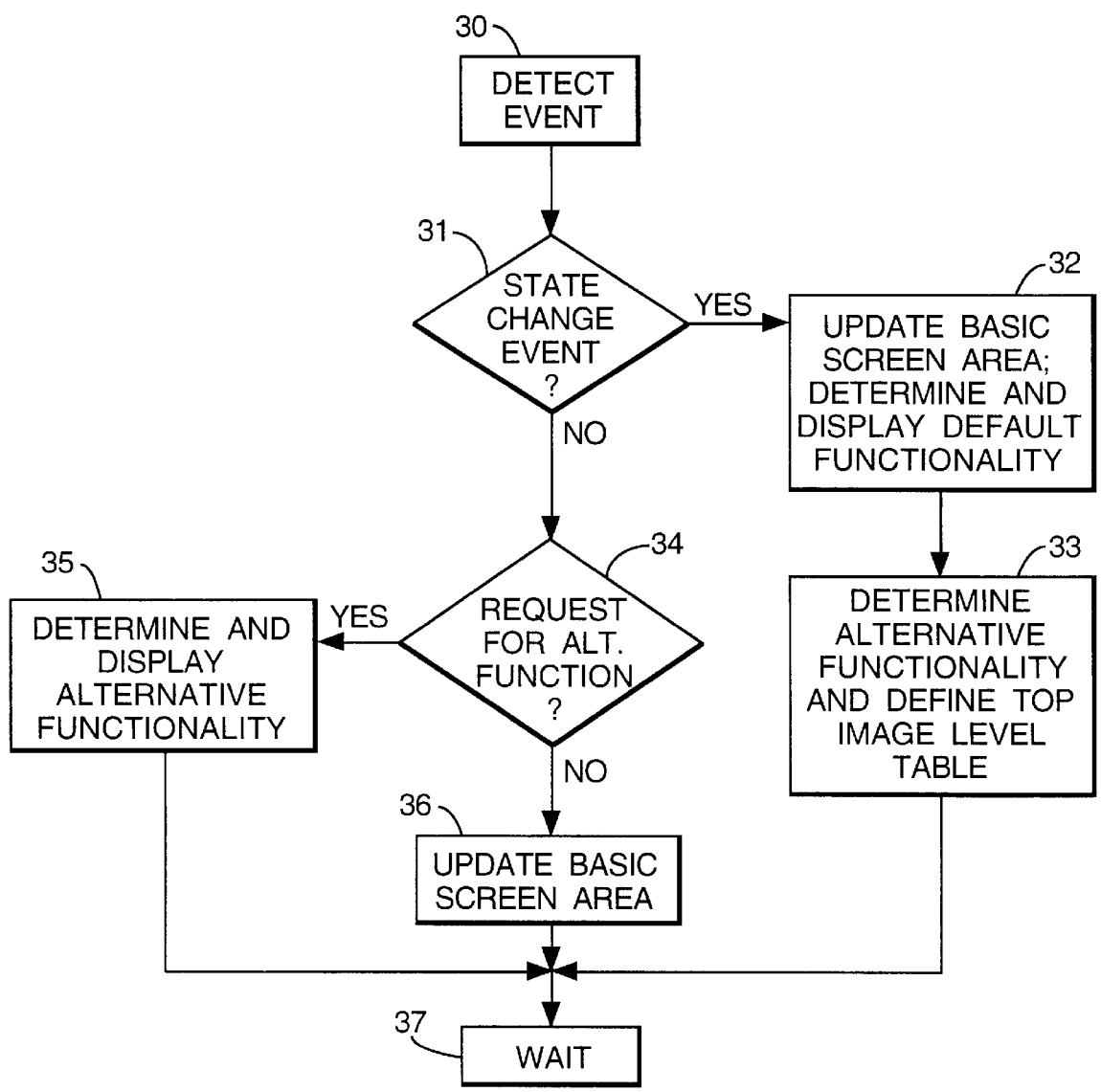

PHONE DISPLAYING ALTERNATIVE FUNCTIONALITY MENU

BACKGROUND OF THE INVENTION

The invention relates to a radiotelephone or handset with a user interface including a display and a keypad, said keypad comprising alphanumeric keys and menu controlling keys, said display comprising a basic screen area for displaying information and a separate field for displaying the present functionality of said menu controlling keys.

The phones sold by the applicants as model Nokia 2110 and Nokia 8110 are exponents of the presently dominating user interface style based on two menu handling keys (soft keys) with multiple functionality for accessing phone setting, handling messages, setting call options, security options, and so on. In idle mode the two soft keys of the phone allow access to the menu structure and the phone book, respectively. When the user enters information into the display and depresses one of the soft keys, all the entered information will disappear from the display and a menu image will appear. This is not a user-friendly way to handle the menu dialog.

SUMMARY OF THE INVENTION

In accordance with the invention there is provided a radiophone with a user interface including a display and a keypad said keypad comprising a set of keys for entering data, at least one multi-functionality key, and a menu scrolling device for scrolling between functionalities of said at least one multi-functionality key, said display comprising a basic screen area for displaying information, said displayed information comprising information entered by said data entering keys and information received from the network, a separate field for displaying the present functionality of said at least one multi-functionality key, and an auxiliary field for displaying alternative functionalities of said at least one multi-functionality key, and a controller which controls the functionality of said multi-functionality key and the information displayed in the display, said controller displaying said auxiliary field on top of a part of the basic screen area in response to the activation of the scrolling device.

The invention provides a user interface for a radiophone, enabling the user to inspect the presence of the entered data during menu or functionality selection.

The data entered into the display will be present as a background picture when a box containing alternative functionalities of the multi-functionality keys appears in a part of the display. This functionality box allows the user to use the scrolling device to identify one functionality and select this by using the appropriate multi-functionality key. During the entire procedure the original data will be at least partly visible as a background picture.

The concept according to the invention is especially useful for radiophones with exactly one multi-functionality key. In this situation the need for accessing alternative functionalities for the multi-functionality key is increased compared with the two-key concept.

In a preferred embodiment of the invention, the menu scrolling device will presently be provided as a pivotal key having at least one pivot axis. This key is normally referred to as a scroll key or an arrow key (up/down).

The phone according to the invention normally includes an LCD display with dots arranged in a matrix. This usually rectangular area is divided into the basic screen area and the separate field for displaying the present functionality of the at least one multi-functionality key. A group of dots in the basic screen area will be dedicated to the auxiliary field when the latter appears on the display. Advantageously, the auxiliary field will be surrounded by a frame serving as a borderline between the auxiliary field and the data display in the basic screen area. Actually, these data will be partly covered by the auxiliary field.

A phone is capable of assuming a plurality of states in dependence on the network activity and the user entries into the phone, and a group of predetermined functionalities may be associated with each of the states. When one of these functionalities is selected in advance as a default functionality for a single multi-functionality key, the default functionality will be displayed in the separate field and the remaining, alternative functionalities in the group will be displayable in the auxiliary field. Normally, the number of alternative functionalities will be quite considerable compared with the number of lines in the display when the letters should be readable. Therefore, the entire set of alternative functionalities is handled as an endless loop, displaying only a few of the alternatives simultaneously. However, the displayed ones are exchanged successively when the scrolling device is used.

BRIEF DESCRIPTION OF THE DRAWINGS

The invention will be explained more fully below in connection with preferred embodiments and with reference to the drawing, in which:

FIG. 5 shows a flow diagram for the control of the pop-up field in a preferred embodiment according to the invention.

DETAILED DESCRIPTION OF THE INVENTION

Figure 1:
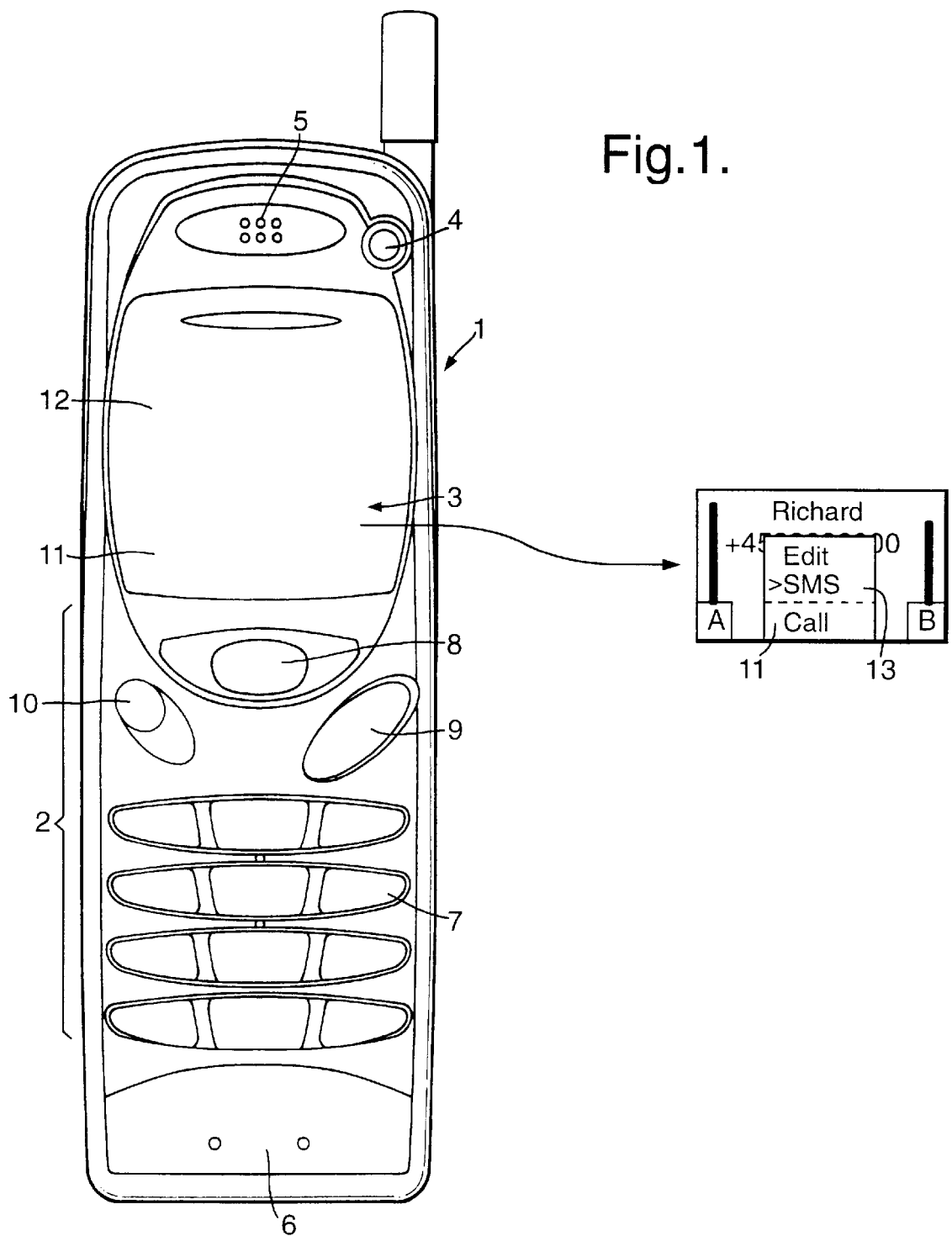
FIG. 1 shows a preferred embodiment of a portable phone having a user interface according to the invention.

FIG. 1 shows a preferred embodiment of a radiophone according to the invention, and it will be seen that the phone, which is generally designated by 1, comprises a user interface having a keypad 2, a display 3, an on/off button 4, an earpiece 5, and a microphone 6. The keypad 2 has a set of keys 7 for entering data. These keys 7 are in the form of alphanumeric keys, by means of which the user can enter numbers and letters, e.g. a phone number, a text message (SMS) or a name (associated with the phone number). The user uses the first group of keys primarily for entering data in the phone (entry events).

In the preferred embodiment, the keypad 2 additionally comprises a single multi-functionality key 8 or soft key whose function depends on the present state of the phone. The default function or the present function of the multi-functionality key 8 is displayed in a separate field 11 below a basic screen area 12 of the display 3. Information entered by said data entering keys and information received from the network are displayed in the basic screen area 12. In the preferred embodiment, the keypad additionally comprises a scrolling device which, in the preferred embodiment, is provided as a scroll key 9 for moving a cursor or a cursing bar in two opposite directions. By means of the scroll key 9 the user can jump selectively from one item to the preceding or the succeeding item in the menu loop of the phone, while he gets access to a submenu loop under the item concerned in the main menu loop by activation of the multi-functionality key. The clear key 10 may be used e.g. for erasing the digit or letter entered last by brief depression, while depression of a longer duration will erase the entire number or word. Like the multi-functionality key 8, the scroll key 9 and the clear key 10 may advantageously be redefined in some states, which appears from the following.

Figure 2:
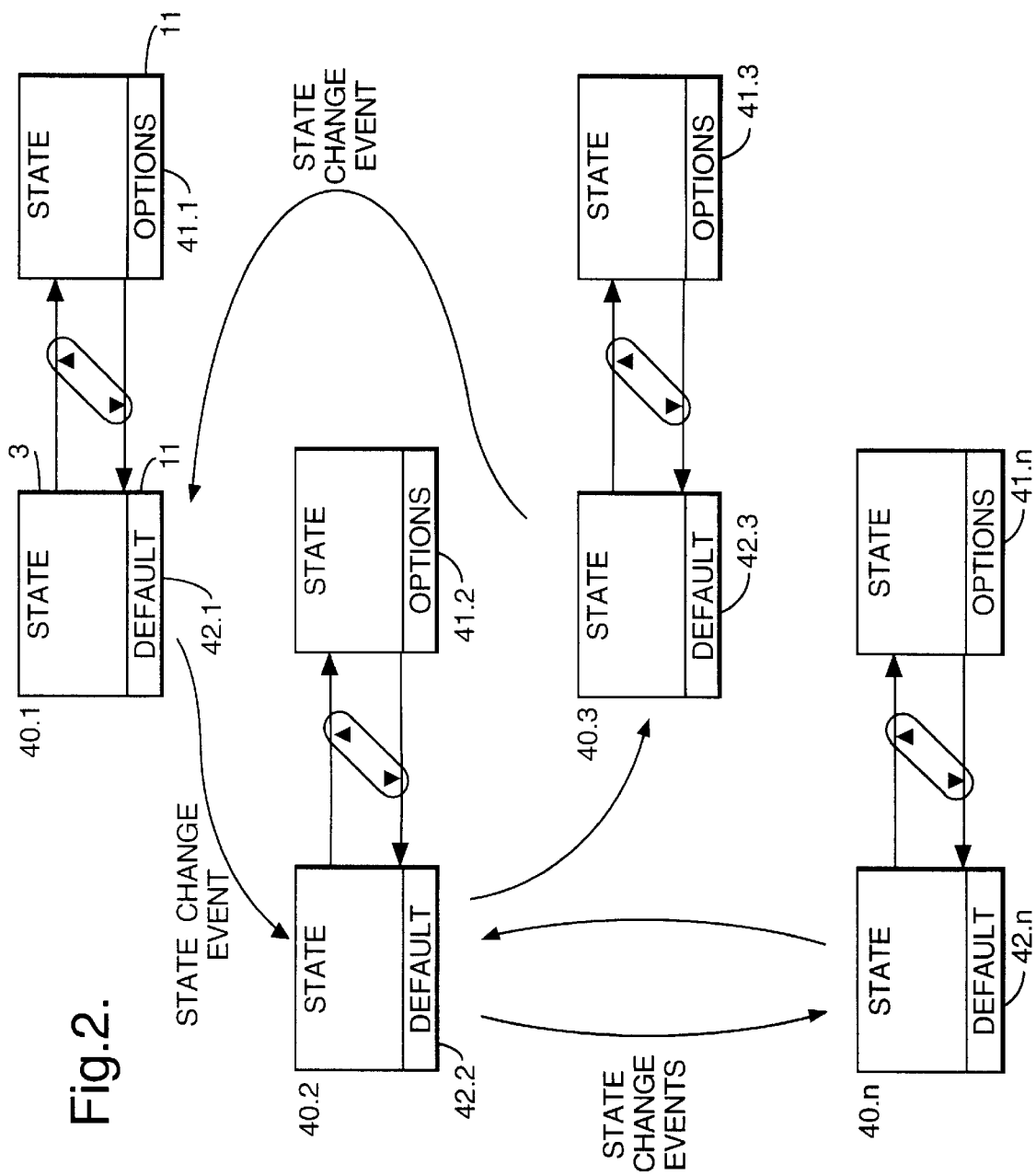
FIG. 2 shows how different states are defined for the phone in dependence on occurred events and the history of the phone.

As will be seen from FIG. 2, a state change event will result in a change from one state to another. The new state depends on the old state and the nature of the state change event. During an established call ("call established" state), the default function of the multi-functionality key 8 will be "end" according to the preferred embodiment. If a new incoming call "is waiting", the user may use the scroll key 9 to produce the option list including items such as "end", "join", "answer" and "swap" without interrupting the call.

Each state 40.1–40.n is associated with a predefined group of functions, actions or options 41.1–41.n, which are possible precisely for that state. Establishment of conference calls, e.g., can be performed only when a call has already been established. A preferred function serving as the default function 42.1–42.n is designated in each of these groups. This designation may be performed by the programmer during programming, by the user through his redefinition of the default function, or by the phone itself in that it records the frequency of the use of the individual functions and appoints the most frequently used one in each group as the default function—optionally with the user's acceptance. The state change is described in the applicants' own British patent application GB 9624520.4.

When the phone changes its state, the multi-functionality key can perform the default function if it is activated, and the user may toggle between the default function and the whole group of options by means of the scroll key. If the group of options is selected with the multi-functionality key, the user will be able to scroll through the group of options with the scroll key and to select the desired (designated) function with the multi-functionality key.

In the preferred embodiment, a CPU 14 of the phone controls the user interface and monitors the network to which the phone is connected. As will be seen from FIG. 3, the CPU 14 is connected to a number of memories 15, each containing information about individual levels in the display image. The CPU extracts part of this information in a predetermined pattern to provide a final display image. This final image is transferred via drivers 16 to the display 3 for display.

The display 3 is provided as a matrix of rectangular dots, e.g. 40×80 dots. Very often 40×6 dots in each side of the display are dedicated to status bars 16 for the antenna signal level (left) and the battery voltage level (right), respectively. In the bottom of the display 8×68 dots are dedicated for the separate field 11 for displaying the present functionality of said multi-functionality key. Preferably, only the central part, e.g. 8×40 dots, is used for that purpose. The basic screen area 12 for displaying information is provided above the separate field 11. This basic screen area 12 then comprises 32×68 dots for displaying information entered by the user, received from the network or created by the phone itself.

Figure 3:
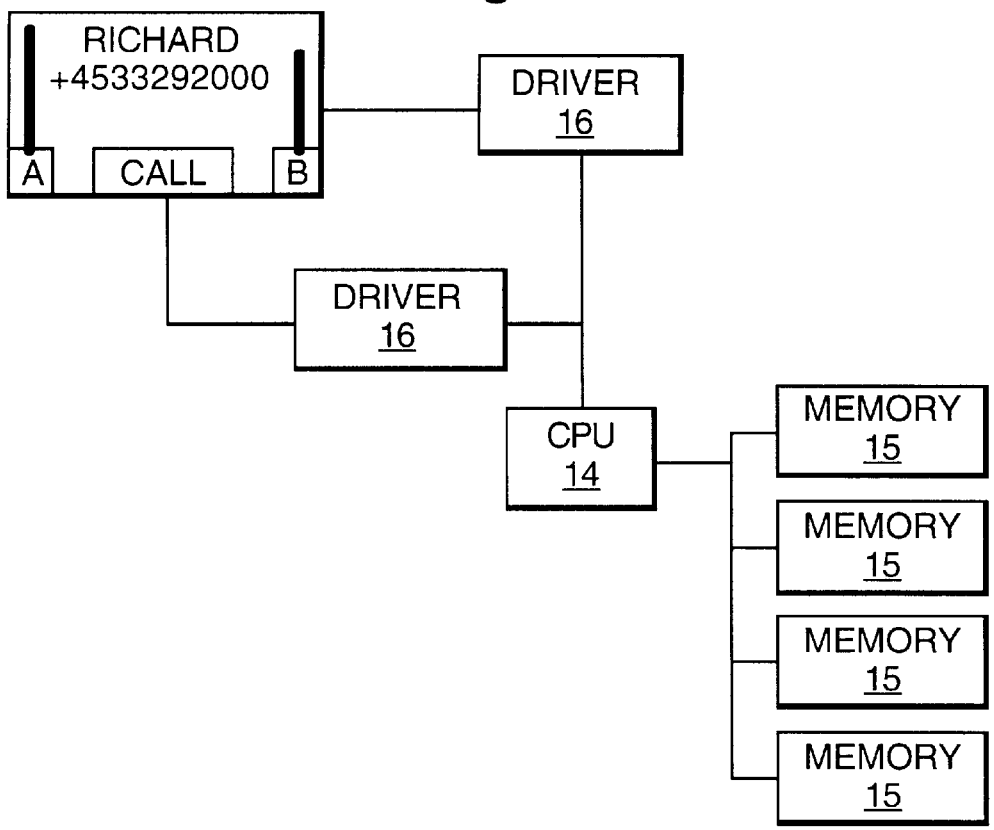
FIG. 3 schematically shows the structure of some parts of the phone necessary for carrying out the invention.

As will be seen from FIG. 3, when the CPU detects a request for the alternative functionality of the multi-functionality key 8, the CPU gets a top image layer from one of the memories 15. This top image layer includes the auxiliary field for displaying alternative functionalities of the multi-functionality key. The CPU 14 controls display 3 to display the top image layer auxiliary field 13 to appear generally superposed over part of the basic screen area 12 of the display. The CPU 14 monitors the state of the phone and updates the top image layer in dependence thereon. The CPU has access to a memory in which available functionalities for each state are stored. Furthermore, when the number of available alternative functionalities exceeds the number of displayable items in the auxiliary field 13, the CPU 14 has to update the items in the top image level every time the scroll key is activated.

Figure 4:
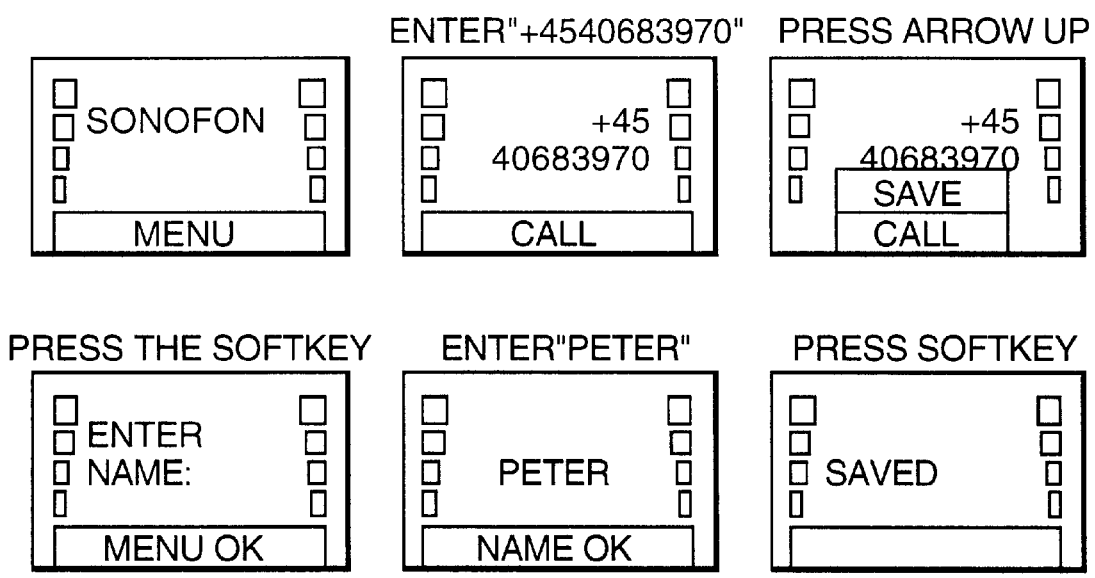
FIG. 4 shows a sequence of images illustrating the pop-up field with the auxiliary functionality in a user interface according to the invention.

The function of the auxiliary field 13 is showed according to a preferred embodiment in an image sequence in FIG. 4. The first image shows the display in idle mode. The basic screen area 12 contains information about the operator who is identified as "SONOFON", while the separate field 11 shows the present functionality of the multi-functionality key 8 which presently gives access to the menu. The two status bars 16 are shown in respective sides of the basic screen area 12. In the next image, the user has entered a phone number "+4540683970" which is displayed in the basic screen area 12. Due to the entry event the phone has entered a new mode and the functionality of the multi-functionality key 8 has changed to make a call.

If the user does not want to make a call but instead wants to save the number in the phone book (database in the phone) he may just depress the scroll key 9. The CPU 14 detects this request for alternative actions and enables the top image layer to appear on the screen. This is done in the third image in the sequence. The auxiliary field 13 appears on the screen with a single item "save". This item is highlighted by reversing the colours. According to the preferred embodiment only a single item is displayed. Other items such as "search", "edit", "erase" and "add" are available via the scroll key 9.

If the "save" functionality is selected by depressing the multi-functionality key 8, the auxiliary field 13 disappears again and the phone asks in the basic screen area for a name corresponding to the phone number already entered. This is done in the fourth image. Due to the state change the multi-functionality key 8 is provided with an acceptance functionality. The user accepts the entered name by activating the multi-functionality key. The name is entered in the fifth image, and in a response to the acceptance the phone informs the user about the saving of the name and number in the sixth image. Shortly afterwards the phone returns to the idle mode display showed as the first image.

FIG. 5 shows a flow diagram for the control of the auxiliary field in a preferred embodiment according to the invention. The CPU 14 monitors the activity of the phone. When an event (an entry event initiated by the user, a network event (e.g. an incoming call) or an event detected in the phone (e.g. battery voltage low)) occurs, this will be detected in step 30. The CPU checks the type of the event, and if it is detected in step 31 that the event is a state change event, the set of functionalities is determined and the default functionality is identified in step 32. Both the basic screen area 12 and the separate field 11 are updated accordingly.

In step 33 the group of alternative functionalities is determined and the full top image level is defined. When this is done, the phone starts waiting for the next event. The next event will be detected in step 30. If the user wants to have access to alternative functionalities, he must activate the scroll key 9. This is not a state change event but a request for access to the alternative functionalities. This is detected in step 34, and the CPU 14 creates an auxiliary field including a window displaying one or more items from the top image level table created in step 33. When this is done, the CPU goes to step 37 and starts waiting for the next event.

When the user enters a phone number in idle mode, the first digit will change the state while the other digits will just update (in step 36) the basic screen area 12 and the wait for the next event.

It must be understood that the auxiliary field can be separated from the separate field for displaying the present functionality of the multi-functionality key. However, it is presently preferred that the two fields are placed adjacent to each other. In an alternative embodiment the auxiliary field covers the separate field, too. Hereby the number of simultaneously displayed alternative items may be increased by one. Then the default functionality may enter the table of alternative functionalities.

The invention has been described with reference to a single multi-functionality key solution. However, benefits may also be derived from applying the invention to a solution using more multi-functionality keys.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A radiophone comprising:
   a controller; and
   a user interface connected to the controller, the user interface including a display and keypad; said keypad comprising a set of keys for entering data, at least one multi-functionality key, and a menu scrolling device for scrolling between functionalities of said at least one multi-functionality key;
   said display comprising a basic screen area for displaying information, a separate field from the basic screen area for displaying the present functionality of said at least one multi-functionality key, and an auxiliary field for displaying alternative functionalities of said at least one multi-functionality key, said auxiliary field being displayed to appear superposed over part of the basic screen area;
   wherein said superposed auxiliary field displays at least one alternative functionality of the multi-functionality key than the present functionality displayed in the separate field, and wherein said controller displays said auxiliary field in said display in response to activation of the scrolling device.

2. A radiophone according to claim 1 wherein the keypad includes exactly one multi-functionality key.

3. A radiophone according to claim 1 wherein the menu scrolling device is provided as a pivotal key having at least one pivot axis.

4. A radiophone according to claim 1 wherein the auxiliary field extends from the separate field into the basic screen area.

5. A radiophone according to claim 4 wherein the auxiliary field is provided with borderlines, and wherein the part of the basic screen area extending outside these borderlines is unaffected by the auxiliary field.

6. A radiophone according to claim 1, said radiophone being capable of assuming a plurality of states in dependence on network activity and the user entries into the phone, each of said states being associated with a group of predetermined functionalities, each functionality of said group of functionalities being enabled to be performed by selecting said one multi-functionality key, said controller displaying a functionality from said group of functionalities as a default functionality in said separate field and all the alternative functionalities in said auxiliary field.

7. A radiophone according to claim 6 wherein the displaying of all the alternative functionalities in said auxiliary field comprises displaying a window with a few alternative functionalities, and wherein the entire set of alternative functionalities is handled as an endless loop where the items are available via the scrolling device.

8. A radiophone according to claim 1 wherein the auxiliary field on top of a part of the basic screen area even appears in response to an activation of said at least one multi-functionality key.

9. A radiophone according to claim 1, wherein the information displayed on the basic screen area comprises information entered by the data entering keys and information received from a network.

10. A radiophone comprising a user interface including a display and a keypad, said keypad includes a set of keys for entering data, at least one multi-functionality key, and a menu scrolling device for scrolling between functionalities of said at least one multi-functionality key, said display includes a basic screen area for displaying information, a separate field for displaying the present functionality of said at least one multi-functionality key; and an auxiliary field for displaying alternative functionalities of said at least one multi-functionality key, and a controller which displays said auxiliary field on top of a part of the basic screen area and aligned with said separate field in response to activation of the scrolling device;
   wherein the auxiliary field on top of part of the basic screen area displays at least an additional functionality of the multi-functionality key than the present functionality displayed in the separate field.

11. A radiophone comprising:
   a controller; and
   a user interface connected to the controller, the user interface comprising a keypad and a display, the keypad comprising at least one multi-functionality key, and a menu scrolling key, the multi-functionality key and the menu scrolling key being operably connected to the controller, and the display being controllably connected to the controller;
   wherein, the display has a first display configuration comprising a basic screen area for displaying information, and a separate field for displaying a first functionality of the multi-functionality key, and wherein in response to activation of the menu scrolling key the display has a second display configuration comprising the basic screen area, the separate field and an auxiliary field appearing superposed over part of the basic screen area of the display, the auxiliary field displaying at least one alternative functionality of the multi-functionality key than the present functionality displayed in the separate field, and being aligned with the separate field on the display screen.

* * * * *